(12) United States Patent
Green (10) Patent No.: US 6,786,134 B2
(45) Date of Patent: Sep. 7, 2004

(54) COFFEE AND TEA DISPENSER

(75) Inventor: Charles Bradley Green, Lawrenceville, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/071,643

(22) Filed: Feb. 7, 2002

(65) Prior Publication Data

US 2003/0145736 A1 Aug. 7, 2003

(51) Int. Cl.[7] .............................................. A47J 31/00
(52) U.S. Cl. ..................................... 99/289 P; 99/295
(58) Field of Search ......................... 99/289 P, 289 R, 99/295, 291, 290, 302 R, 316

(56) References Cited

U.S. PATENT DOCUMENTS

| | | |
|---|---|---|
| 2,968,560 A | 1/1961 | Goros .......................... 99/77.1 |
| 3,589,272 A | 6/1971 | Bouladon ..................... 99/295 |
| 3,823,656 A | 7/1974 | Vekekn ......................... 99/295 |
| 3,952,641 A | 4/1976 | Vitous .......................... 99/295 |
| 4,158,330 A | 6/1979 | Vitous .......................... 99/295 |
| 4,254,694 A | 3/1981 | Illy .............................. 99/295 |
| 4,429,623 A | 2/1984 | Illy .............................. 99/295 |
| 4,471,689 A | 9/1984 | Piana ........................... 99/295 |
| 4,581,239 A | 4/1986 | Woolman et al. ............ 426/433 |
| 4,644,855 A | 2/1987 | Woolman et al. ............. 99/280 |
| 4,829,889 A * | 5/1989 | Takeuchi et al. ........... 99/289 P |
| 4,846,052 A | 7/1989 | Favre et al. .................. 99/295 |
| 4,860,645 A | 8/1989 | van der Lijn et al. ........ 99/295 |
| 4,886,674 A | 12/1989 | Seward et al. ................ 426/79 |
| 4,941,399 A | 7/1990 | Zucchetti ....................... 99/289 |
| 4,995,310 A | 2/1991 | van der Lijn et al. ........ 99/295 |
| 4,995,978 A | 2/1991 | Van de Gang .............. 210/474 |
| 5,134,924 A * | 8/1992 | Vicker .................. 99/289 R X |
| 5,190,652 A | 3/1993 | van Thoor et al. ......... 210/474 |
| 5,197,374 A | 3/1993 | Fond ............................ 99/295 |
| 5,325,765 A | 7/1994 | Sylvan et al. ................. 99/295 |
| 5,343,799 A | 9/1994 | Fond ............................ 99/295 |
| 5,347,916 A | 9/1994 | Fond et al. .................... 99/295 |
| 5,398,595 A | 3/1995 | Fond et al. .................... 99/295 |
| 5,398,596 A | 3/1995 | Fond ............................ 99/295 |
| 5,402,707 A | 4/1995 | Fond et al. .................... 99/295 |
| 5,472,719 A * | 12/1995 | Favre ....................... 99/295 X |
| 5,505,120 A | 4/1996 | Albertson ..................... 99/286 |
| 5,637,335 A | 6/1997 | Fond et al. .................... 426/84 |
| 5,840,189 A * | 11/1998 | Sylvan et al. ............. 99/295 X |
| 5,855,161 A * | 1/1999 | Cortese ..................... 99/289 P |
| 5,992,298 A * | 11/1999 | Illy et al. ...................... 99/281 |
| 6,079,315 A * | 6/2000 | Beaulieu et al. .......... 99/289 R |
| 6,082,247 A | 7/2000 | Beaulieu .................... 99/302 R |
| 6,095,032 A | 8/2000 | Barnett et al. ................ 99/286 |
| 6,103,116 A | 8/2000 | Koslow et al. ............. 210/282 |
| 6,142,063 A | 11/2000 | Beaulieu et al. ............. 99/283 |
| 6,182,554 B1 | 2/2001 | Beaulieu et al. .......... 99/289 R |
| 6,440,256 B1 | 8/2002 | Gordon et al. ............. 156/293 |
| 6,517,880 B2 | 2/2003 | Walters, Jr. et al. ........ 426/433 |
| 2001/0052294 A1 | 12/2001 | Schmed ....................... 99/295 |
| 2002/0059870 A1 | 5/2002 | Walters, Jr., et al. ......... 99/298 |
| 2003/0145736 A1 | 8/2003 | Green .......................... 99/280 |

FOREIGN PATENT DOCUMENTS

| | | |
|---|---|---|
| FR | 2 617 389 | 6/1987 |
| WO | WO 93/17932 | 9/1993 |

* cited by examiner

*Primary Examiner*—Reginald L. Alexander
(74) *Attorney, Agent, or Firm*—Sutherland Asbill & Brennan LLP (57) ABSTRACT

A beverage system for brewing a beverage from a beverage material and a source of hot, pressurized water. The beverage system may include a cartridge with the beverage material therein. The cartridge may include a seal positioned about the beverage material. The beverage system also may include an injection system for injecting the hot, pressurized water into the cartridge so as to brew the beverage from the beverage material.

23 Claims, 7 Drawing Sheets

COFFEE AND TEA DISPENSER

TECHNICAL FIELD

The present invention relates generally to a beverage dispenser and more particularly relates to a beverage dispenser that provides coffee, espresso, tea, and other brewed beverages in a high speed and a high quality manner.

BACKGROUND OF THE INVENTION

Several different types of beverage brewing systems are known in the art. For example, percolators and drip-type coffee makers have long been used to make regular or "American"-type coffee. Hot water is generally passed through a container of coffee grinds so as to brew the coffee. The coffee then drips into a pot or a cup. Likewise, pressure-based devices have long been used to make espresso-type beverages. Hot, pressurized water may be forced through the espresso grinds so as to brew the espresso. The espresso may then flow into the cup.

One of the drawbacks with these known systems may focus on their use in self-serve or high volume restaurants or other types of retail outlets. For example, a high quality espresso beverage simply may take too long to brew with conventional equipment in a high volume restaurant. Similarly, the amount of time it may take to seep a cup of tea also may be too long. As a result, a customer may choose to go elsewhere for his or her brewed beverage.

Further, although regular or American coffee may be made in sufficient quantity for a high volume restaurant or in any other type of establishment, the customer may prefer a beverage brewed immediately at that time and that location. Brewing smaller amounts of coffee, however, has not always produced a quality beverage and, again, may take too much time as to be practical or economical.

What may be desired, therefore, is a beverage dispenser that can produce coffee, espresso, tea, and other types of brewed beverages in a high quality and high speed manner to individual consumers in individual servings. The device, however, preferably should be easy to use, easy to maintain, and be competitive in terms of cost.

SUMMARY OF THE INVENTION

The present invention thus provides a beverage system for brewing a beverage from a beverage material and a source of hot, pressurized water. The beverage system may include a cartridge with the beverage material therein. The cartridge may include a seal positioned about the beverage material. The beverage system also may include an injection system for injecting the hot, pressurized water into the cartridge so as to brew the beverage from the beverage material.

Specific embodiments of the present invention may include the injection system having an injection nozzle for penetrating the seal surrounding the beverage material. The injection system also may include an injection head positioned about the injection nozzle. The injection head may include a sealing ring positioned about the injection nozzle so as to create a seal between the injection head and the cartridge. The injection system may include a drive system so as to maneuver the injection head about the cartridge. The drive system may include an eccentric cam. The drive system may maneuver the injection head into contact with the cartridge with about 135 to about 160 kilograms (about 300 to about 350 pounds) of force.

The cartridge may include a first end and a second end. The first end may include an insert positioned a predetermined distance under the seal such that the injection nozzle may penetrate the seal but not the insert. The second end may include a scored area such that the scored area may release from the seal under the application of pressure. The seal may include a foil.

A further embodiment of the present invention may provide a device for holding a beverage brewing material. The device may include a container with the beverage brewing material therein. The container may have a first end and a second end. The first end of the container may include a wall. The wall may include a number of apertures therein. A first seal may be positioned about the wall by a predetermined distance and a second seal may be positioned about the second end. The predetermined distance may be about one (1) to about four (4) centimeters (about 0.4 to about 1.6 inches). The wall may be an insert. The first seal and the second seal each may be a foil such that the device maintains the beverage brewing material in a substantially airtight manner. The second seal may include a scored area such that the scored area may release from the second seal upon the application of pressure. The second end may include a filter layer. The container may be made out of a thermoplastic.

A further embodiment of the present invention may provide a beverage system for producing a beverage from a source of hot water and a number of beverage material containers. The beverage system may include a plate with a number of apertures therein. The apertures may be sized to accommodate the beverage material containers. The system also may include an injection station positioned about the plate. The injection station may include means for injecting the beverage material containers with hot water from the hot water source so as to produce the beverage.

The beverage system further may include a drive motor so as to drive the plate and a limit switch in communication with the drive motor. The plate may include one or more detents positioned therein such that the detents may align with the limit switch so as to stop the movement of the plate.

The injecting means may include an injection nozzle for penetrating the beverage material containers. The injecting means may include an injection head positioned about the injection nozzle. The injecting means also may include a sealing ring positioned about the injection nozzle so as to create a seal between the injection head and the beverage material containers. The injecting means may include an injection drive system so as to maneuver the injection head about the beverage material containers. The injection drive system may include an eccentric cam. The injection drive system may maneuver the injection head into contact with the beverage material containers with about 135 to about 160 kilograms (about 300 to about 350 pounds) of force.

The beverage system further may include a loading assembly positioned about the plate. The loading assembly may include a container carousel for storing the beverage material containers. The loading assembly also may include a loading mechanism so as to place the beverage material containers within the apertures of the plate. The loading mechanism may include an escapement ratchet operated by a solenoid.

The beverage system further may include an ejector assembly positioned about the plate. The ejector system may include a lift mechanism positioned about the plate so as to remove the beverage material containers from the apertures. The lift mechanism may include a plunger operated by a solenoid. The ejector system may include a sweep mechanism so as to push the beverage material containers off of the plate. The sweep mechanism may include a rotating arm operated by a solenoid.

A further embodiment of the present invention may provide a beverage system for producing a beverage from a source of hot water and a number of beverage material containers. The beverage system may include a transport assembly for maneuvering the beverage material containers, a loading assembly positioned adjacent to the transport assembly for loading the beverage material containers onto the transport assembly, an injection station positioned adjacent to the transport assembly for injecting the beverage material containers with hot water from the hot water source, and an ejection station positioned adjacent to the transport assembly for removing the beverage material containers from the transport assembly.

A further embodiment of the present invention may provide a beverage system for brewing a beverage from a container of beverage material. The beverage system may include a primary source of hot, pressurized water, an injection system so as to insert the hot, pressurized water into the container of beverage material to produce a primary beverage stream, a secondary source of hot water, and a mixing container for mixing the hot water from the secondary source with the primary beverage stream so as to produce the beverage. The secondary source of hot water may include a hot water reservoir. The primary source of hot, pressurized water may include a heat exchanger in communication with the hot water reservoir. The primary source of hot, pressurized water may include a pump. The pump may be capable of multiple flow rates. The mixing container may include a collection funnel.

A method of the present invention may provide for preparing a brewed beverage from a beverage material and a flow of water. The beverage material may be positioned within a container having a first seal and a second seal. The method may include the steps of pressurizing the flow of water, heating the flow of water, injecting the flow of water into the container of beverage material through the first seal, and bursting the second seal such that the beverage may flow out of the container.

The flow of water may be pressurized to about 2 to 14 kilograms per square centimeter (about 30 to about 200 pounds per square inch) and heated to about 82 to 93 degrees Celsius (about 180 to 200 degrees Fahrenheit). The method may include the further step of mixing the beverage and a secondary water flow. The second seal of the container may include a scored area and the step of bursting the second seal may include bursting the scored area.

The beverage material may include espresso grinds such that the injecting step provides the flow of water through the container at about nine (9) to about fourteen (14) kilograms per square centimeter (about 130 to about 200 pounds per square inch.) The beverage material may include coffee grinds such that the injecting step provides the flow of water through the container at about two (2) to about (14) kilograms per square centimeter (about 30 to about 200 pounds per square inch.) The beverage material may include tealeaves such that the injecting step provides the flow of water through the container at about two (2) to about (4) kilograms per square centimeter (about 30 to about 60 pounds per square inch.)

These and other features of the present invention will become apparent upon review of the following detailed description of the preferred embodiments when taken in conjunction with the appended claims and drawings.

DETAILED DESCRIPTION OF THE PREFERRED EMBODIMENTS

Figure 1:
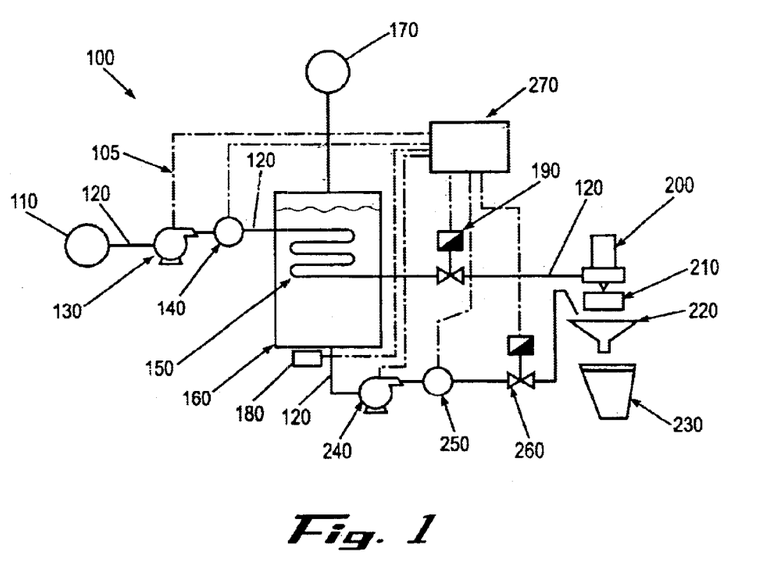
FIG. 1 is a schematic view of a beverage dispenser system of the present invention.

Referring now to the drawings, in which like numerals refer to like elements throughout the several views, FIG. 1 shows a schematic view of a beverage dispenser system 100 of the present invention.

Water Control System

The beverage dispenser system 100 may include a control system 105. The water control system 105 controls the flow of water within the beverage dispenser system 100 so as to produce a beverage. The water control system 105 may include a water source 110. The water source 110 may be a source of tap water or any other type of conventional water supply. The water may be at atmospheric pressure and is preferably chilled to about 15 to about 24 degrees Celsius (about 60 to about 75 degrees Fahrenheit).

Water from the water source 110 may be transported throughout the beverage dispenser system 100 via one or more water lines 120. The water lines 120 may be any type of conventional piping. The water lines 120 may be made out of copper, stainless steel, other types of metals, plastics, rubber, and other types of substantially non-corrosive types of materials. Preferably, copper or a similar material may be used due to the heat and the pressure involved herein. The size or the diameter of the water lines 120 may depend upon on the size and the anticipated volume of the overall beverage dispenser system 100. In general, the water lines 120 may be about 0.95 centimeters (about ⅜ths of an inch) or larger in inside diameter so as to provide the beverage dispenser system 100 with a throughput of about 1000 to 1500 milliliters (about 34 to about 50 ounces) of brewed beverages per minute.

Connected to one or more of the water lines 120 may be an extraction pump 130. The extraction pump 130 may pump and pressurize the water from the water source 110 so as to drive the water through the beverage dispenser system 100. The extraction pump 130 may be a conventional diaphragm pump, a centrifugal pump, a rotary vane pump, or a gear pump. Other types of conventional pumps also may be used. The speed of the pump 130 is preferably proportional to the flow rate therethrough. The pump 130 may have a flow rate of about 180 to 1500 milliliters per minute (about 6 to 50 ounces per minute) depending upon the size and volume of the overall beverage dispenser system 100. The pump 130 may be capable of different flow rates. The pump 130 may increase the pressure of the water from about atmospheric to about fourteen (14) kilograms per square centimeter (about zero (0) to about 200 pounds per square inch).

Positioned on or in communication with one of the water lines 120 downstream of the extraction pump 130 may be a flow sensor 140. The flow sensor 140 may measure the amount of water flowing through the water line 120 as pumped by the extraction pump 130. The flow sensor 140 may be of conventional design and may include a turbine or a paddle wheel type sensor.

Positioned on or in communication with one of the water lines 120 downstream of the flow sensor 140 may be a heat exchanger 150. The heat exchanger 150 may be a conventional coil-type or cross flow type heat exchanger and may be made out of copper, stainless steel, or similar types of materials. The heat exchanger 150 may be positioned within a hot water reservoir 160. The water within the heat exchanger 150 is heated as it passes through the hot water reservoir 160. The hot water reservoir 160 may be a conventional hot water container. The reservoir 160 may be made out of copper, stainless steel, brass or similar types of materials. Depending upon the overall size and capacity of the beverage dispenser system 100, the hot water reservoir 160 may hold about seven (7) to about nineteen (19) liters (about two (2) to about five (5) gallons) of water. The water within the hot water reservoir 160 may be heated by a conventional heat source 180. The heat source 180 may include a resistance device, a heat pump, or similar types of heating devices. The heat source 180 may heat the water within the hot water reservoir 160 to approximately 87 to about 96 degrees Celsius (about 180 to about 205 degrees Fahrenheit).

The hot water reservoir 160 may be fed from a secondary water source 170. The secondary water source 170 may be identical to the water source 110 described above. The secondary water source 170 may be a source of tap water or a similar type of a conventional water supply. The secondary water source 170 may be connected to the hot water reservoir 160 by one or more water lines 120 as described above.

Positioned on or in communication with one or more of the water lines 120 downstream of the heat exchanger 150 and the hot water reservoir 160 may be a solenoid valve 190. The solenoid valve 190 may open and close the one or more water lines 120 downstream from the heat exchanger 150 and the hot water reservoir 160. The solenoid valve 190 may be of conventional design.

Positioned on or in communication with one or more of the water lines 120 downstream of the solenoid valve 190 may be an injection nozzle 200. The injection nozzle 200 may direct a stream of the hot, high pressure water as the water exits the heat exchanger 150. Possible physical embodiments of the injection nozzle 200 will be described in more detail below.

Also as will be discussed in more detail below, the injection nozzle 200 may act in cooperation with a pod cartridge 210. The pod cartridge 210 may contain coffee, tea, espresso or other types of brewed beverage grinds or leaves within a foil seal. The pod cartridge 210 may be reusable or disposable. The injection nozzle 200 may inject the hot, high pressure water stream into the pod cartridge 210 so as to brew the coffee, tea, espresso or other type of beverage. The injection nozzle 200 may be capable of penetrating the seal before injecting the water flow into the pod cartridge 210.

Downstream of the pod cartridge 210 may be a collection funnel 220. The collection funnel 220, as will be described in more detail below, may be a conventionally shaped funnel structure. A cup 230, a pot, or other type of drinking vessel may be positioned underneath the collection funnel 220 so as to receive the brewed coffee, tea, espresso, or other type of brewed beverage.

A make-up water pump 240 may be in communication with the hot water reservoir 160 via one or more of the water lines 120. The make-up pump 240 may be identical to the extraction pump 130 described above. Alternatively, the make-up pump 240 also may include a peristaltic or a gear type pump. The make-up pump 240 need not pressurize the make-up water flow. The pump 130 may have a flow rate of about 1000 to about 1250 milliliters per minute (about 33 to about 42 ounces per minute) depending upon the size and anticipated volume of the overall beverage dispenser system 100. The make-up pump 240 may be capable of different flow rates. The pump 240 may be capable of pressures of about 0.2 to 0.4 kilograms per square centimeter (about three (3) to about five (5) pounds per square inch).

Positioned on or in communication with one or more of the water lines 120 downstream of the make-up pump 240 may be a make-up water flow sensor 250. The make-up flow sensor 250 may be identical or similar to the flow sensor 140 described above.

Positioned on or in communication with one of the water lines 120 downstream of the flow indicator 250 may be a make-up water solenoid valve 260. The solenoid valve 260 may be identical or similar to the solenoid valve 190 described above. Instead of the solenoid valve 260 and the make-up pump 240, the flow of water downstream of the hot water reservoir 160 may be controlled by a gravity feed system. In other words, the water from the hot water reservoir 160 may be allowed to flow downstream once the solenoid valve 260 is opened.

One or more of the water lines 120 may connect the solenoid valve 260 and the collection funnel 220. Hot water from the hot water reservoir 160 may be mixed with the brewed coffee, tea, espresso, or other beverage from the injection nozzle 200 in the collection funnel 220 before being dispensed into the cup 230 so as to alter the strength or character of the beverage.

An electronic control 270 may monitor and control the operation of the beverage dispenser system 100 as a whole and each of the components therein. The electronic control 270 may be a microcontroller such as a PIC16F876 controller sold by Microchip Technology of Chandler, Arizona or a similar type of device.

The electronic control 270 may control the operation of the extraction pump 130, the flow sensor 140, the heat source 180, the solenoid valve 190, the make-up water pump 240, the make-up flow sensor 250, the make-up solenoid valve 260, and other elements herein. Specifically, the electronic control 270 may monitor the amount of water dispensed by the extraction pump 130 via the flow sensor 140. When the appropriate amount of water has been dispensed, the solenoid valve 190 may shut one or more of the water lines 120. Likewise when a make-up water flow is required, the electronic control 270 may monitor the water flow as provided by the makeup pump 240 based upon the information provided by the makeup flow sensor 250 so as to turn the make-up solenoid valve 260 on and off. The electronic control 270 also may monitor and vary the speed and flow rate of the pumps 130, 240. The electronic control 270 also may monitor and control the temperature of the water in the heat exchanger 150 and the water reservoir 160 as well as the heat source 180.

Pod Brewing Apparatus

Figure 2:
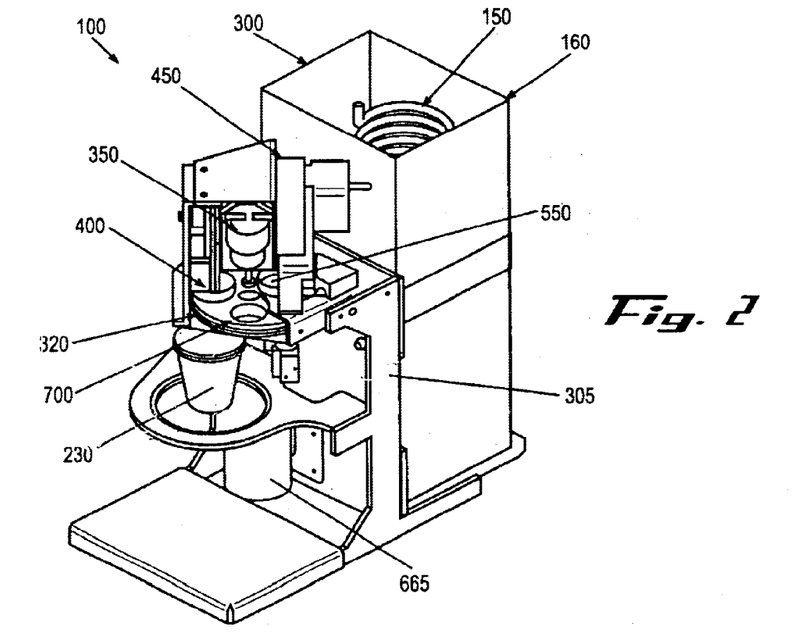
FIG. 2 is a perspective view of one embodiment of the beverage dispenser system of the present invention.
Figure 3:
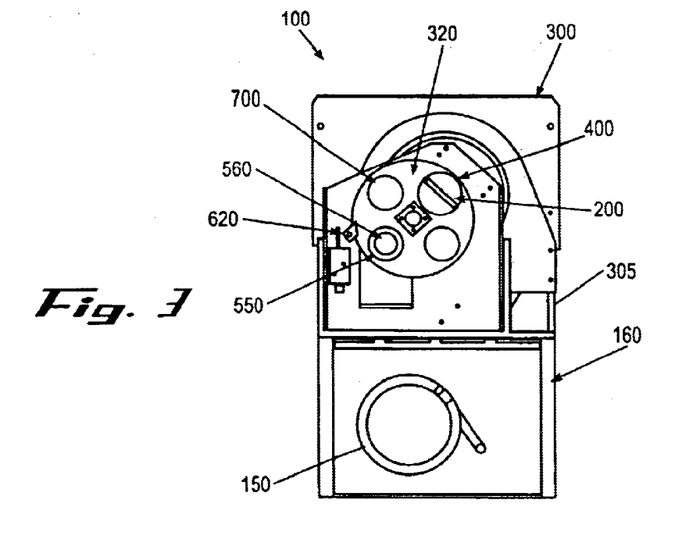
FIG. 3 is a top plan view of the beverage dispenser system of FIG. 2.

FIGS. 2 and 3 show one application of the beverage dispenser system 100. In these figures, a pod brewing apparatus 300 is shown. The pod brewing apparatus 300 may include each of the elements as described above for the water control system 105, including the heat exchanger 150 positioned within the hot water reservoir 160 and the injection nozzle 200 as is shown. In this embodiment, the elements of the beverage dispenser system 100 as a whole are mounted onto a dispenser frame 305. The dispenser frame 305 may be made out of stainless steel, aluminum, other types of metals, or other types of substantially noncorrosive materials.

The Turret Assembly

Figure 4:
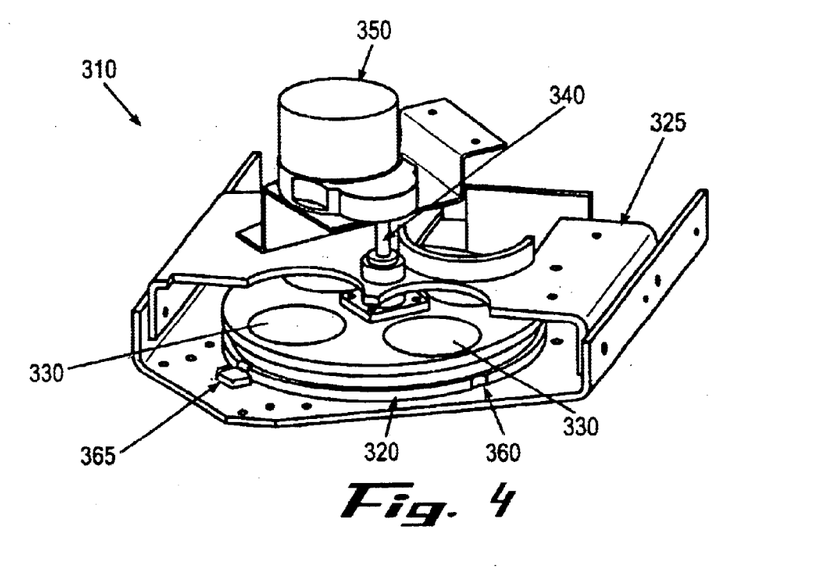
FIG. 4 is a perspective view of the turret system of the beverage dispenser system of FIG. 2.

As was described above, the injection nozzle 200 may interact with the pod cartridges 210 so as to produce the desired beverage. The pod cartridges 210 may be positioned in the beverage dispenser system 100 within a turret assembly 310. The turret assembly 310 may be fixedly attached to the dispenser frame 305. As is shown in FIG. 4, the turret assembly 310 may include a turret plate 320 positioned within a turret frame 325. The turret frame 325 may be made out of stainless steel, aluminum, other types of conventional metals, or similar types of substantially noncorrosive materials. The turret plate 320 may be substantially circular. The turret plate 320 may include a number of pod apertures 330. The pod apertures 330 may be sized to accommodate the pod cartridges 210. The turret plate 320 may spin about a turret pin 340. A turret motor 350 may drive the turret assembly 310. The turret motor 350 may be a conventional AC motor or a similar type of device. The turret motor 350 may drive the turret assembly 310 at about six (6) to about thirty (30) rpm, with about twenty-five (25) rpm preferred.

The turret plate 320 also may have a number of detents 360 positioned about its periphery. The detents 360 may be positioned about each of the turret apertures 330. The detents 360 may cooperate with one or more limit switches 365 so as to control the rotation of the turret plate 320. Once the electronic control 270 activates the operation of the turret motor 350 so as to spin the turret plate 320, the rotation of the plate 320 may be stopped when the limit switch 360 encounters one of the detents 360.

The Injector Assembly

Figure 5:
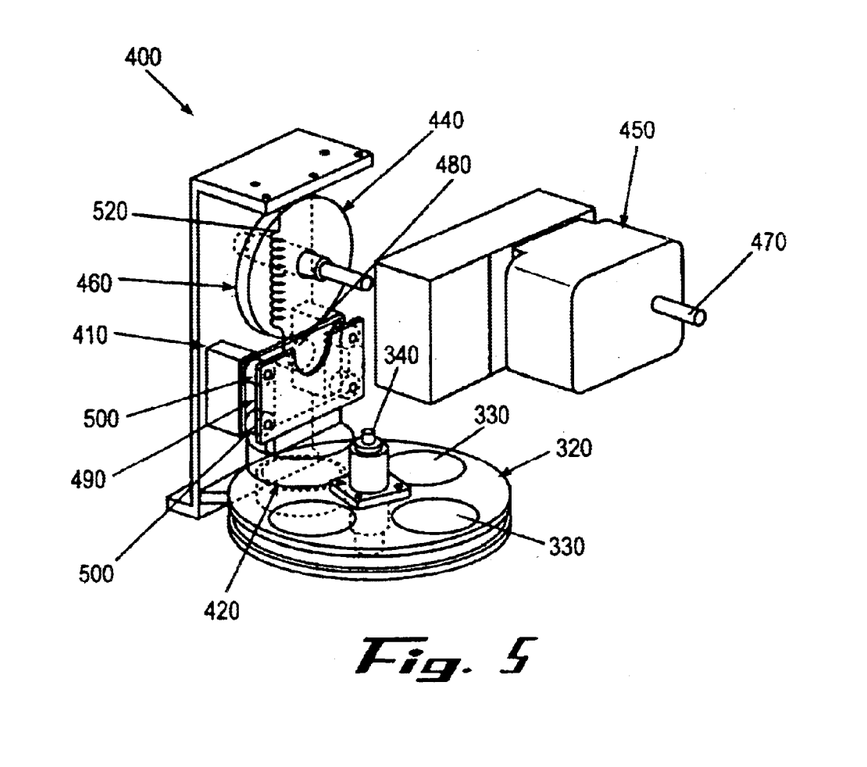
FIG. 5 is a perspective view of the injector assembly of the beverage dispenser system of FIG. 2 with the guide wheels and the return spring of the support plate shown in phantom lines.
Figure 6:
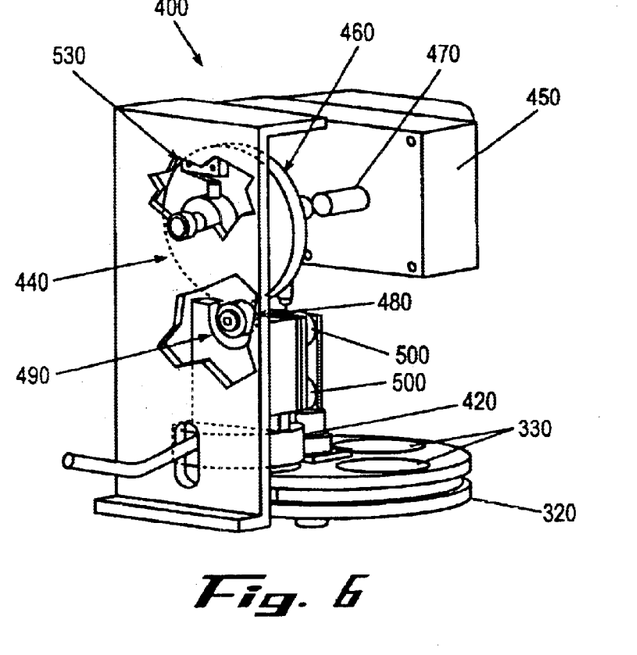
FIG. 6 is a rear perspective view of the injector assembly of the beverage dispenser system of FIG. 2 with the idler wheel and the limit switch shown in a cut away view.

Positioned adjacent to the turret assembly 310 may be an injector assembly 400. The injector assembly 310 may be fixedly attached to the dispenser frame 305. As is shown in FIGS. 5 and 6, the injector assembly 400 may include the injection nozzle 200 as described above. The injection nozzle 200 may have a diameter of about 0.3 to about 0.65 millimeters (about one-eight to about one-quarter inches). The injection nozzle 200 may be somewhat conical in shape so as to penetrate the pod cartridge 210. The injector assembly 400 also may include an injector frame 410 extending above the turret assembly 310. The injector frame 410 may be made out of stainless steel, other types of metals, or similar types of substantially noncorrosive materials.

The injector assembly 400 may include an injector head 420. The injector head 420 may include the injection nozzle 200 as described above. The injector head 420 may be slightly larger in diameter than the pod cartridges 210. The injector head 420 also may be made out of stainless steel, plastics, or similar types of substantially noncorrosive materials. The injector head 420 may include a sealing ring 430 positioned about its lower periphery. The sealing ring 430 may be made out of rubber, silicone, or other types of elastic materials such that a substantially water tight seal may be formed between the injector head 420 and the pod cartridge 210. One or more of the water lines 120 may be connected to the injection nozzle 200 and the injector head 420. As is described above, the water lines 120 may connect the injection nozzle 200 with the heat exchanger 150 so as to provide hot, pressurized water to the pod cartridges 210.

The injector head 420 may be moveable in the substantially vertical plane via a cam system 440. (The terms "vertical" and "horizontal" are used as a frame of reference as opposed to absolute positions. The injector head 420 and the other elements described herein may operate in any orientation.) A cam system drive motor 450 may drive the cam system 440. The drive motor 450 may be a conventional AC motor similar to the turret motor 350 described above. The drive motor 450 also may be a shaded pole or a DC type motor. The drive motor 450 may rotate an eccentric cam 460 via a drive belt system 470. The drive motor 450 and the gear system 470 may rotate the eccentric cam 460 at about six (6) to about thirty (30) rpm, with about twenty-five (25) rpm preferred. The eccentric cam 460 may be shaped such that its lower position may have a radius of about 4.1 to about 4.8 centimeters (about 1.6 to 1.9 inches) while its upper position may have a radius of about 3.5 to 4.1 centimeters (about 1.3 to about 1.7 inches).

The eccentric cam 460 may cooperate with an idler wheel 480. The idler wheel 480 may be in communication with and mounted within a support plate 490. The support plate 490 may maneuver about the injector frame 410. The support plate 490 may be made out of stainless steel, other types of steel, plastics, or other materials. The support plate 490 may be fixedly attached to the injector head 420. The support plate 490 may have a number of guide wheels 500 positioned thereon such that the support plate 490 can move in the vertical direction within the injector frame 410. A return spring 520 also may be attached to the support plate and the injector frame 410. A limit switch 530 may be positioned about the cam 460 such that its rotation may not exceed a certain amount.

The injector head 420 thus may maneuver up and down in the vertical direction via the cam system 440. Specifically, the drive motor 450 may rotate the eccentric cam 460 via the gear system 470. As the eccentric cam 460 rotates with an ever-increasing radius, the idler wheel 480 pushes the support plate 490 downward such that the injector head 420 comes in contact with a pod cartridge 210. The eccentric cam 460 may lower the injector head 420 by about 6.4 to about 12.7 millimeters (about one-quarter to about one-half inches). Once the injector head 420 comes into contact with the pod cartridge 210, the eccentric cam 460 may continue to rotate and increases the pressure on the pod cartridge 210 until the cam 460 reaches the limit switch 530. The electronic control 270 then directs the drive motor 450 to hold the cam 460 in place for a predetermined amount of time. The electronic control 270 then reverses the cam system 440 such that the injector head 420 returns to its original position.

The Ejector Assembly

Figure 7:
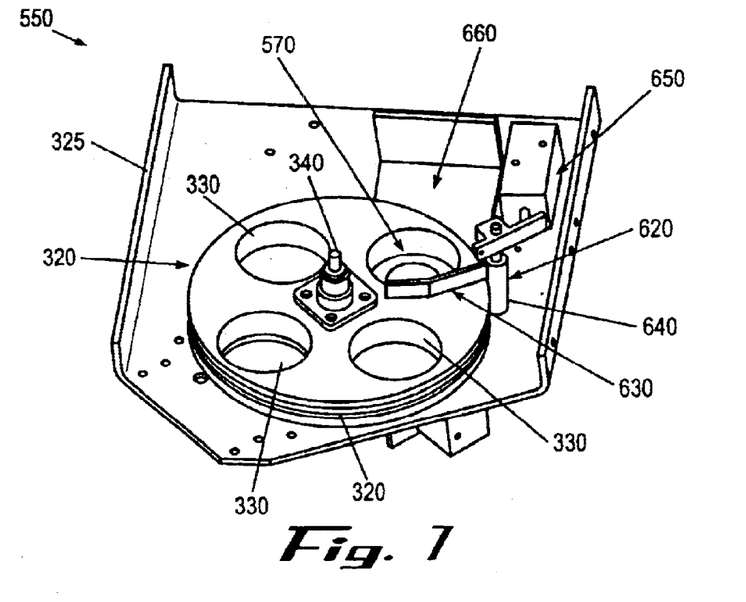
FIG. 7 is a perspective view of the ejector system of the beverage dispenser system of FIG. 2.
Figure 8:
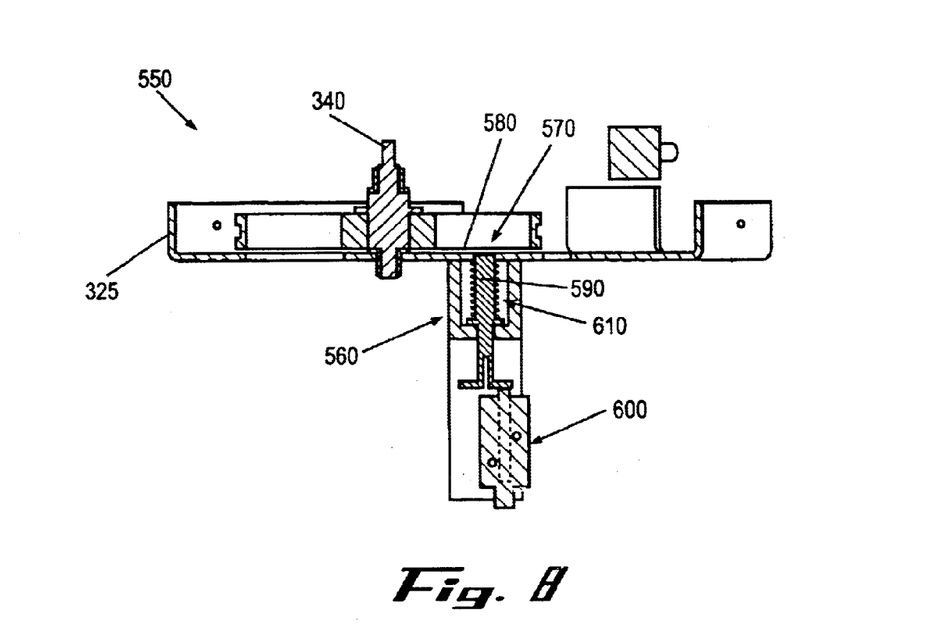
FIG. 8 is a side cross sectional view of the ejector system of FIG. 7 taken along line A—A.

FIGS. 7 and 8 show an ejector system 550. The ejector system 550 may be positioned about the dispenser frame 305 adjacent to the injector assembly 400. The ejector system 550 may include a lift system 560. The lift system 560 may be positioned underneath the turret plate 320. The lift system 560 may include a lift pad 570 positioned underneath the turret plate 320. The lift pad 570 may be made out of stainless steel, other types of steel, plastics, or similar types of materials. The lift plate 570 may be substantially plunger-like in shape with a top plate 580 extending from a shaft 590. The lift pad 570 may move in a substantially vertical direction as powered by an ejector solenoid 600. The ejector solenoid 600 may be of conventional design and may operate at about 0.6 to about 1.4 kilograms (about 1.5 to about 3 pounds) of force. Operation of the ejector solenoid 600 may be controlled by the electronic control 270. A return spring 610 may be positioned about the shaft 590 of the lift pad 570. The return spring 610 may limit the vertical extent of travel of the lift pad 570 and also then return the lift pad 570 to its original position.

The ejector system 550 also may include a sweep system 620. The sweep system 620 may be positioned above the turret plate 320. The sweep system 620 may be positioned on the turret frame 325. The sweep system 620 may include a sweeper arm 630. The sweeper arm 630 may be positioned for rotation on an arm post 640. A sweeper solenoid 650 may be positioned on the turret frame 325. The sweeper solenoid 650 may be of conventional design and may operate at about 0.2 to about 0.7 kilograms (about 0.5 to about 1.5 pounds) of force. Operation of the sweeper solenoid 650 may be controlled by the electronic control 270. Activation of the sweeper solenoid 650 causes the arm 630 to rotate about the arm post 640. Positioned adjacent to the sweeper solenoid 650 may be a disposal hole 660 positioned within the turret frame 325. The sweeper arm 630 thus may sweep the spent pod cartridges 210 as lifted by the lift system 560 into the disposal hole 660. Specifically, the lift system 560 lifts the pod cartridge 210 out of the pod aperture 330. The sweeper system 620 then sweeps the pod cartridge 210 off of the turret plate 320 and into the disposal hole 660. One or more collection bins 665 may be positioned underneath or in communication with the disposal hole 660 so as to collect the spent cartridges 210.

The Loading Assembly

Figure 9:
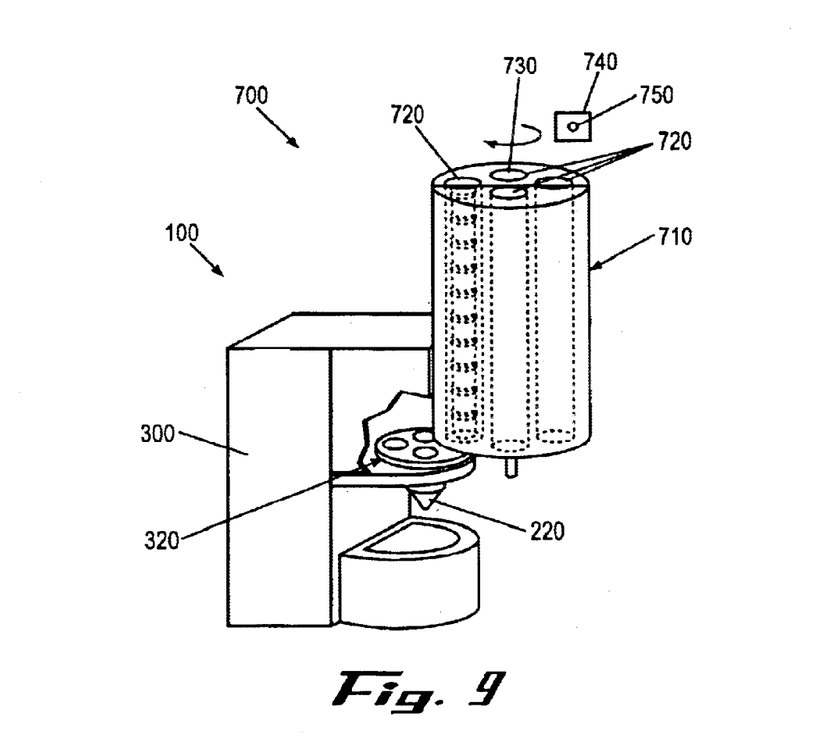
FIG. 9 is a perspective view of the loading system of the beverage dispenser system of FIG. 2 with the pod cartridges and the turret assembly shown in a cut away view.
Figure 10:
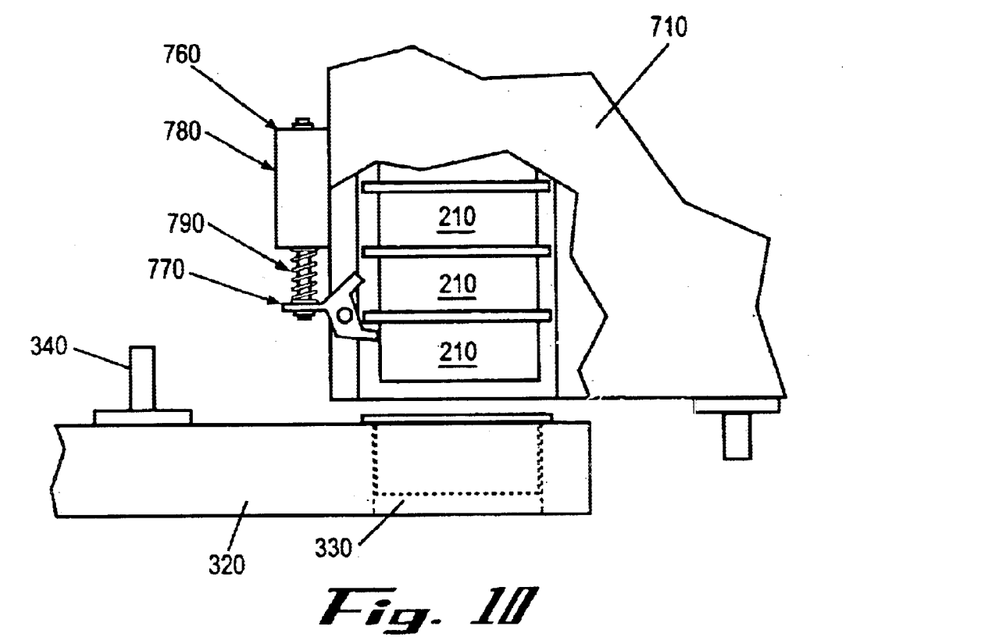
FIG. 10 is a cut away view of the loading mechanism of the loading assembly of FIG. 9.

Also positioned on the dispenser frame 305 adjacent to the ejector assembly 550 may be a loading assembly 700. As is shown in FIGS. 9 and 10, the loading assembly 700 may be mounted adjacent to the turret frame 325. The loading assembly 700 may include a pod carousel 710. The pod carousel 710 may be a substantially tubular structure with a number of pod compartments 720 positioned therein. A number of the pod cartridges 210 may be positioned within each of the pod compartments 720. The pod compartments 720 may be substantially tubular or cylindrical in shape structures. The pod carousel 710 may be rotated about a pod spindle 730. The pod carousel 710 may be rotated via a spindle motor 740. The spindle motor 740 may be in conventional AC motor similar to the turret motor 350 described above. The spindle motor 740 also may be a shaded pole or a DC type motor. The spindle motor 740 may rotate the pod carousel 710 via a drive belt system 750. The spindle motor 740 may rotate the pod carousel 710 at about six (6) to about thirty (30) rpm, with about twenty-five (25) rpm preferred. The pod carousel 710 also may have a number of detents or similar structures positioned about each pod compartment 720. The detents may cooperate with a limit switch so as to control the rotation of the pod carousel 710 in a manner similar to the use of the limit switch 360 and the detents 370 of the turret assembly 310 described above.

Positioned adjacent to each pod compartment 720 within the loading assembly 700 may be a loading mechanism 760. The loading mechanism 760 may include an escapement ratchet 770. The escapement ratchet 770 may be powered by a dispensing solenoid 780. The dispensing solenoid 780 may be of conventional design. The dispensing solenoid 780 may operate at about 1.3 to about 2.3 kilograms (about three (3) to about five (5) pounds). A return spring 790 may be positioned about the dispensing solenoid 780 so as to return the escapement ratchet 770 to its original position after use. Activation of the dispensing solenoid 780 causes the escapement ratchet 770 to rotate so as to permit one of the pod cartridges 210 to drop out of the pod compartment 720 and into one of the apertures 330 of the turret assembly 310. Operation of the loading assembly 700 and the elements therein may be controlled by the electronic control 270.

The Pod Cartridge

Figure 11:
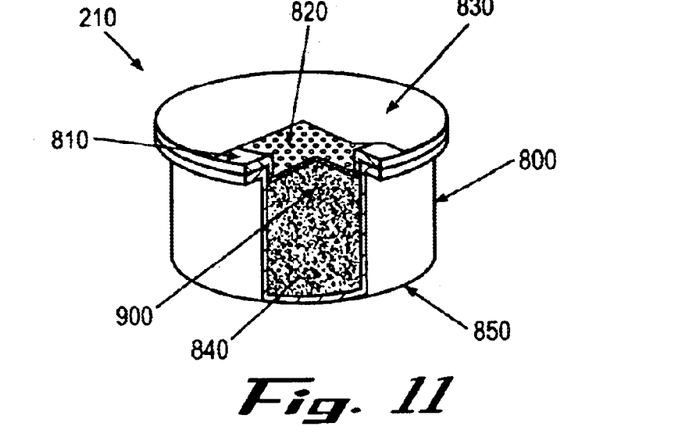
FIG. 11 is a cut away view of a beverage pod cartridge for use with the present invention.
Figure 12:
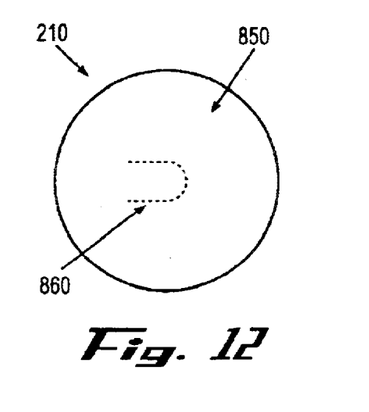
FIG. 12 is a bottom plan view of the beverage pod of FIG. 11.

FIGS. 11 and 12 show one embodiment of the pod cartridge 210. The pod cartridge 210 may include a cup 800. The cup 800 may be made out of a conventional thermoplastic such as polystyrene or polyethylene. Alternatively, metal such as stainless steel or similar types of substantially noncorrosive materials also may be used. The cup 800 may be substantially rigid. An insert 810 may enclose the top end of the cup 800. The insert 810 also may be made out of a thermoplastic or a similar material as is used for the cup 800. The insert 810 may have a plurality of apertures 820 therein. The insert 810 may be offset somewhat from the top of the cup 800. In other words, a gap 825 may exist over the insert 810. The top of the cup 800 may be enclosed with a seal 830. The seal 830 may be made out of a foil or a similar type of substantially airtight materials.

The bottom end of the cup 800 may include a filter layer 840. The filter layer 840 may be made out of a paper filter material or similar types of material. A bottom seal 850 may enclose the bottom end of the cup 800. The bottom seal 850 also may be made out of a foil or a similar type of material. The bottom seal 850 may have a scored area 860 positioned therein. The scored area 860 may detach from the bottom seal 850 upon the application of internal pressure.

The cup 800 may be filled with a brewing material 900. The brewing material 900 may be coffee, espresso, or similar types of coffee grinds; tealeaves; or any other type of beverage material that is desired to be brewed. If the cup 800 has a diameter of about 3.7 to four (4) centimeters (about 1.5 to 1.6 inches) and a depth of about 1.8 to about two (2) centimeters (about 0.7 to about 0.8 inches), about six (6) to about eight (8) grams of the brewing material 900 may be positioned within the cup 800. The seals 830, 850 may keep the beverage material 900 in a substantially airtight manner for freshness purposes.

The Vending Machine

Figure 13:
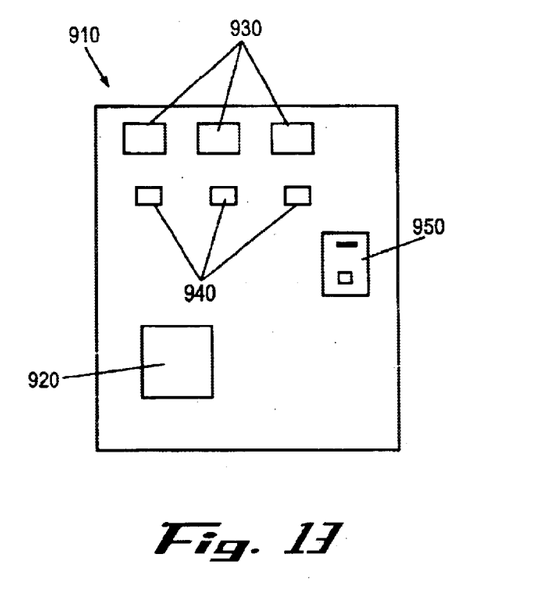
FIG. 13 is a plan view of the exterior of a vending machine that may be used with the beverage dispenser system of the present invention.

FIG. 13 shows one embodiment of the beverage dispenser system 100. In this case, a vending machine, machine 910 is shown. The pod brewing apparatus 300, as described above, may function within the vending machine 910. The vending machine 910 may include a dispensing area 920. The dispensing area 920 allows the consumer to remove the cup 230 from the vending machine 910. The vending machine 910 also may have a number of selection indicators 930. The selection indicators may be push buttons or other types of signals by which the consumer can indicate a preference for coffee, tea, espresso, etc. The vending machine 910 also may have a number of addition indicators 940. The addition indicators 940 may allow the consumer to add a measure of, for example, milk, cream, sugar, or other types of additives and/or flavorings to the brewed beverage. The vending machine 910 also may have a payment device 950. The payment device 950 may be of conventional design.

In Use

In use, a number of the pod cartridges 210 may be filled with different types of grinds, leaves, or other types of the brewing material 900. In the case of a single serving sized espresso beverage of about thirty (30) milliliters, about six (6) to about eight (8) grams of espresso grinds may be placed in the pod cartridge 210. Likewise, about six (6) to about (8) grams of coffee grinds may be added to the pod cartridge 210 in order to produce about a 240 milliliter (about eight (8) ounce) cup of coffee. About three (3) to about five (5) grams of tealeaves may be added to the pod cartridge 210 in order to make about a 150 milliliter (about five (5) ounce) cup of tea. The pod cartridges 210 may then be sealed and inserted within the loading assembly 700. A different type of pod cartridge 210 may be positioned within each of the pod compartment 720.

Once a consumer pushes one of the selection indicators 930 on the vending machine 910, or otherwise makes a selection, the electronic control 270 may operate the spindle motor 740 such that the correct pod compartment 720 of the pod carousel 710 rotates into place. The pod carousel 710 rotates such that the appropriate pod cartridge 210 may drop into the correct turret aperture 330 of the turret assembly 310. As is shown in FIGS. 9 and 10, the loading mechanism 760 of the loading assembly 700 then activates the dispensing solenoid 780 to rotate the escapement ratchet 770 so as to allow the pod cartridge 210 to drop into place. Alternatively, the user may place the pod cartridge 210 into place on the on the turret plate 320.

Once the pod cartridge 210 is in position within the aperture 330, the electronic control 270 activates the turret motor 350 so as to rotate the turret plate 320 towards the injector assembly 400. The turret motor 350 ceases operation when the limit switch 360 and the detent 370 on the turret plate 320 align.

Once the pod cartridge 210 is in position adjacent to the injector assembly 400, the electronic control 270 activates the drive motor 950 of the cam system 440. As is shown in FIGS. 5 and 6, the drive motor 450 may activate the drive belt system 470 so as to rotate the eccentric cam 460. The eccentric cam 460 may rotate so as to lower the support plate 490 and the injector head 420. The injector head 420 may be lowered about 0.64 centimeters (about a quarter inch). The injector head 420 thus comes into contact with the pod cartridge 210. The injector head 420 may engage the pod cartridge 210 with a downward force of about 136 to 160 kilograms (about 300 to 350 pounds). The sealing ring 430 thus may form a substantially airtight and water tight seal about the pod cartridge 210. The downward motion of the injector head 420 and the operation of the drive motor 450 are stopped by the position of the limit switch 530.

Figure 14:
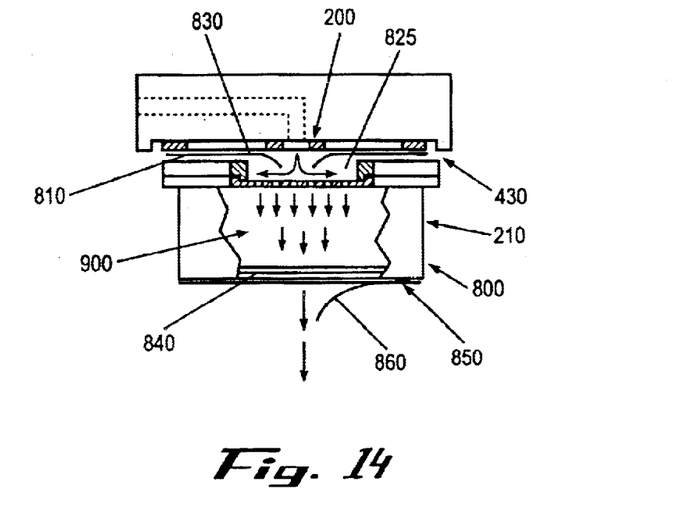
FIG. 14 is a side cross-sectional view of the pod cartridge and the injection head with the water flow path therethrough shown.

As is shown in FIG. 14, the injection nozzle 200 of the injector head 420 may penetrate the top seal 830 of the pod cartridge 210. The electronic control 270 then may activate the solenoid valve 190 so as to allow hot, high pressure water to flow from the heat exchanger 150 into the injection nozzle 200. The water may be at about 82 to about 93 degrees Celsius (about 180 to about 200 degrees Fahrenheit). The incoming water flow may be pressurized at about 11 to 14 kilograms per square centimeter (about 160 to 200 pounds per square inch). Because of the nature of the brewing material 900, the pressure of the water passing through the pod cartridge 210 may be about 1.4 to 14 kilograms per square centimeter (about 20 to about 200 pounds per square inch). The pressure of the water flowing through the pod cartridge 210 may vary with the nature of the brewing material 900.

The water passes through the injection nozzle 200 and spreads out over the insert 810 of the plastic cup 800 of the pod cartridge 210. The water then flows through the apertures 820 of the insert and passes into the brewing material 900. The pressure of the incoming water flow may cause the scored area 860 of the bottom seal 850 to open such that the brewed beverage passes out of the pod cartridge 210, into the collection funnel 220, and into the cup 230.

The electronic control 270 also may turn on the extraction pump 130 so as to draw in more water from the water source 110. The flow sensor 140 may monitor the amount of water flowing through the water lines 120. The water passes into the heat exchanger 150 positioned within the hot water reservoir 160. The water is then heated to the appropriate temperature. Once a sufficient amount of water has passed into the injector nozzle 200, the electronic control 270 may close the solenoid valve 190 and turn off the extraction pump 130.

In the case of an espresso beverage, the water may flow through the pod compartment 210 with a pressure of about 9.8 to 14 kilograms per square centimeter (about 140 to about 200 pounds per square inch). The water may take about ten (10) seconds to brew a cup 230 of espresso.

A cup 230 of tea may be brewed in the same manner as the espresso beverage described above. Because of the nature of brewing material 900, in this case the tealeaves, the water flows through the pod cartridge 210 with only about 3 kilograms per square centimeter (about 40 pounds per square inch) of pressure. The tea may take about ten to about 20 seconds to brew.

A cup 230 of coffee may be brewed in a somewhat different manner. First, the pod cartridge 210 with the brewing material 900 therein, in this case the coffee grinds, is brewed in the same manner as described above with respect to the espresso beverage. In the case or regular or "American" coffee, the water may flow through the pod cartridge 210 with a pressure of about 9.8 to 14 kilograms per square centimeter (about 140 to about 200 pounds per square inch), with a pressure of about 12.6 kilograms per square centimeter (about 180 pounds per square inch) preferred. Alternatively with a coarser grind, the water may have a pressure of about only 3 kilograms per square centimeter (about 40 pounds per square inch). The coffee may take about 10 to about 12 seconds to brew.

Second, an amount of makeup water may then be added to the beverage at the collection funnel 220 before or while the beverage is being dispensed into the cup 230. Specifically, the electronic control 270 may open the make-up water solenoid valve 260 and activate the make-up water pump 240. An amount of water from the hot water reservoir 160 then flows into the collection funnel 220 as monitored by the flow sensor 250. Alternatively, the make-up water pump 240 and the flow sensor 250 may be omitted such that the water flows from the hot water reservoir 160 under the force of gravity. Either way, once the appropriate amount of water has been added to the collection funnel 220, the electronic control 270 again closes the solenoid valve 260. In the case of about a 240 milliliter (about eight (8) ounce) cup 230 of coffee, about 40 milliliters (about 1.4 ounces)

will be brewed through the pod cartridge 210 and an additional 180 to 200 milliliters (about 6 to 6.6 ounces) of hot water will be added at the collection funnel 220.

Once the beverage is brewed, the drive motor 450 of the cam system 400 of the injector assembly 400 may then reverse direction so as to lift the injector head 420 away from the pod cartridge 210. The turret motor 350 then may rotate the turret plate 320 of the turret assembly 310 such that the pod cartridge 210 is positioned within the ejector system 550 as is shown in FIGS. 7 and 8. Once again, the rotation of the turret plate 320 may be controlled via the detents 370 aligning with the limit switch 360.

The electronic control 270 may then activate the lift system 560. Specifically, the solenoid 600 may lift the lift pad 570 so as to push the pod cartridge 210 out of the aperture 330 of the turret plate 320. The electronic control 270 may then activate the sweep system 620 such that the sweeper solenoid 650 rotates the arm 630. The arm 630 may then push the pod cartridge 210 into the disposal hole 660. The return spring 610 then returns the lift pad 570 to its original position. The pod cartridges 210 may then be disposed of or cleaned and refilled with the brewing material 900.

An additional pod cartridge 210 may be loaded onto the turret assembly 310 by the loading assembly 700 while one pod cartridge 210 is in the injector assembly 400 and a further pod cartridge 210 is in the ejector system 550. A number of beverages therefore may be brewed immediately one after another in a high speed and high quality manner. Further, a number of loading, injection, and ejection stations may be used together.

It should be apparent that the foregoing relates only to the preferred embodiments of the present invention and that numerous changes and modifications may be made herein without departing from the spirit and scope of the invention as defined by the following claims and the equivalents thereof.

I claim:

1. A beverage system for brewing a beverage from a beverage material and a source of hot, pressurized water, comprising:
   a cartridge with the beverage material therein;
   said cartridge comprising a sealing layer positioned about the beverage material; and
   an injection nozzle for injecting the hot, pressurized water into said cartridge so as to brew the beverage from the beverage material;
   said cartridge comprises a first end and wherein said first end comprises an insert positioned a predetermined distance under said sealing layer such that said injection nozzle may penetrate said sealing layer but not said insert.

2. The beverage system of claim 1, wherein said cartridge comprises a second end and a second sealing layer and wherein said second sealing layer comprises a scored area such that said scored area may release from said second sealing layer under the application of pressure.

3. The beverage system of claim 2, wherein said sealing layer comprises a foil.

4. A beverage system for producing a beverage from a source of hot water and a number of beverage material containers, comprising:
   a plate;
   said plate comprising a plurality of apertures, said plurality of apertures sized to accommodate directly to beverage material containers;
   said aperture extending from a first side of said plate to a second side of said plate; and
   an injection station positioned about said plate;
   said injection station comprising means for injecting the beverage material containers with hot water from the hot water source so as to produce the beverage.

5. The beverage system of claim 4, further comprising a drive motor so as to drive said plate.

6. The beverage system of claim 5, further comprising a limit switch positioned adjacent to said plate, said limit switch being in communication with said drive motor.

7. The beverage system of claim 6, wherein said plate comprises one or more detents positioned therein such that said detents may align with said limit switch so as to stop the movement of the plate.

8. The beverage system of claim 4, wherein said injecting means comprises an injection nozzle for penetrating the beverage material container.

9. The beverage system of claim 8, wherein said injecting means comprises an injection bead positioned about said injection nozzle.

10. The beverage system of claim 9, wherein said injecting means comprises a sealing ring positioned about said injection nozzle so as to create a seal between said injection head and the beverage material containers.

11. The beverage system of claim 9, wherein said injecting means comprises an injection drive system so as to maneuver said injection head about the beverage material containers.

12. The beverage system of claim 11, wherein said injection drive system comprises an eccentric cam for maneuvering said injection head about the beverage material containers.

13. The beverage system of claim 11, wherein said injection drive system maneuvers said injection head into contact with the beverage material containers with about 135 to about 160 kilograms of force.

14. The beverage system of claim 4, further comprising a loading assembly positioned about said plate.

15. The beverage system of claim 14, wherein said loading assembly comprises a container carousel for storing the beverage material containers.

16. The beverage system of claim 15, wherein said loading assembly comprises a loading mechanism so as to place the beverage material containers within one of said plurality of apertures of said plate.

17. The beverage system of claim 16, wherein said loading mechanism comprises an escapement ratchet operated by a solenoid.

18. The beverage system of claim 4, further comprising an ejector assembly positioned about said plate.

19. The beverage system of claim 18, wherein said ejector system comprises a lift mechanism positioned about said plate so as to remove the beverage material containers from one of said plurality of apertures of said plate.

20. The beverage system of claim 19, wherein said lift mechanism comprises a plunger operated by a solenoid.

21. The beverage system of claim 18, wherein said ejector system comprises a sweep mechanism so as to push the beverage material containers off of said plate.

22. The beverage system of claim 21, wherein said sweep mechanism comprises a rotating arm operated by a solenoid.

23. A beverage system for producing a beverage from a source of hot water and a number of beverage material containers, comprising:
   a transport assembly for maneuvering the beverage material containers;

a loading assembly positioned adjacent to said transport assembly for loading the beverage material containers onto said transport assembly;

an injection station positioned adjacent to said transport assembly for injecting the beverage material containers with hot water from the hot water source;

said injection station comprising an eccentric cam; and an ejection station positioned adjacent to said transport assembly for removing the beverage material container from said transport assembly.

* * * * *

UNITED STATES PATENT AND TRADEMARK OFFICE
CERTIFICATE OF CORRECTION

PATENT NO. : 6,786,134 B2
DATED : September 7, 2004
INVENTOR(S) : Charles B. Green It is certified that error appears in the above-identified patent and that said Letters Patent is hereby corrected as shown below:

Title page,
Item [56], References Cited, FOREIGN PATENT DOCUMENTS, please add:
-- EP 0326099 Al    Zucchetti           1/1989
   EP 0780307 Al    Binacchi            10/1996
   EP 0780310 Al    Binacchi            10/1996
   EP 0780370 A3    Hasselbach, et al.  10/1996
   EP 1042978 Al    Cordone             4/2000
   WO 93/17932      Cordone             3/1992
   WO 98/23196      Pugh                11/1996
   WO 01/60220 Al   LaZaris             8/2001
   WO 01/60712 Al   Sweeney             8/3001 --

Signed and Sealed this

Eighteenth Day of January, 2005

JON W. DUDAS
*Director of the United States Patent and Trademark Office*